United States Patent [19]

Morishima

[11] Patent Number: 5,590,112
[45] Date of Patent: Dec. 31, 1996

[54] TRACK JUMP CONTROLLER FOR CORRECTING INFORMATION READ ERRORS

[75] Inventor: Morito Morishima, Hamamatsu, Japan

[73] Assignee: Yamaha Corporation, Hamamatsu, Japan

[21] Appl. No.: 349,767

[22] Filed: Dec. 6, 1994

[30] Foreign Application Priority Data

Dec. 8, 1994 [JP] Japan ...................................... 5-340670

[51] Int. Cl.$^6$ .............................. G11B 27/34; G11B 7/00
[52] U.S. Cl. ..................... 369/124; 369/32; 369/44.28; 369/58
[58] Field of Search ................................ 369/124, 44.28, 369/32, 47, 50, 59, 48, 33, 43, 58

[56] References Cited

U.S. PATENT DOCUMENTS

| 4,796,247 | 1/1989 | Vogelsang | 369/33 |
| 5,195,069 | 3/1993 | Nakano | 369/44.28 |
| 5,420,839 | 5/1995 | Tateishi | 369/32 |
| 5,465,244 | 11/1995 | Kobayashi et al. | 369/50 |

Primary Examiner—Georgia Y. Epps
Assistant Examiner—Kim-Kwok Chu
Attorney, Agent, or Firm—Loeb & Loeb LLP

[57] ABSTRACT

A rotation control section rotates a compact disk about twice as fast as a reproduction speed. Data read out by a pickup section are stored into a cache memory and then sequentially read out by a reproduction address generation circuit at a predetermined reproduction speed. When the cache memory runs out of empty storage space, a control circuit returns the pickup section to an inner track. Further, when some error is present in the read-out data, the pickup section is returned to a track where the error has originated so as to reread the data.

19 Claims, 5 Drawing Sheets

TRACK JUMP CONTROLLER FOR CORRECTING INFORMATION READ ERRORS

BACKGROUND OF THE INVENTION

This invention relates to an optical disk device which can be produced at a low cost, yet achieves very reliable and stable performance.

In the conventional optical disk devices such as CD (Compact Disc) players, the data read speed, i.e., rotation speed of an optical disc must be controlled so as to match a predetermined data reproduction speed. These optical disk devices are ordinarily provided with error correction circuitry to correct reproduced data if any error is detected in the reproduced data.

With such conventional optical devices, however, it is absolutely necessary to accurately control the data read speed, i.e. rotation speed of the optical disk in order to match the data read speed with the data reproduction speed. Therefore, the disc rotation control system of the devices tends to be very complicated in structure, thus considerably increasing the overall production cost of the optical disk devices. Further, if the optical disk has any scratch, flaw or the like so many read errors may occur within a short time period that appropriate error correction is impossible to perform. In such a case, the conventional optical disk devices can not reread from the optical disk and thus lack reliability and stability in performance.

SUMMARY OF THE INVENTION

It is therefore an object of the present invention to provide an optical disk device which can be produced at low cost, yet achieves very reliable and stable performance.

In order to achieve the above-mentioned object, an optical disk device according to one aspect of the present invention comprises a pickup section for reading out data recorded on an optical disk along tracks formed thereon, a rotation control section for rotating the optical disk in such a manner that the pickup section is allowed to read out the data faster than a predetermined reproduction speed, a storage unit for storing the data read out by the pickup section, a readout section for sequentially reading out the data stored in the storage unit at the predetermined reproduction speed, and a control section for, when an amount of the data in the storage unit which has not yet been read out by the readout section reaches a predetermined value, returning the pickup section to any of the tracks from which the data has already been read out by the pickup section.

An optical disk device according to another aspect of the present invention comprises a pickup section for reading out data recorded on an optical disk along tracks formed thereon, a rotation control section for rotating the optical disk, a storage unit for storing the data read out by the pickup section, a readout section for sequentially reading out the data stored in the storage unit at a predetermined reproduction speed, and a control section for, when any uncorrectable error is detected in the data read out by the pickup section, returning the pickup section to one of the tracks where the error has originated.

According to one aspect of the present invention, the pickup section is returned to a track from which data has already been read out, when an amount of the data in the storage unit which has not yet been read out by the readout section reaches a predetermined value. On the other hand, the readout section reads out data from the storage unit at a predetermined reproduction speed. This arrangement allows the data to be reproduced at an accurate reproduction speed, without the need for accurately controlling the rotations of the optical disk.

According to another aspect of the present invention, when some uncorrectable error is detected in the data read out by the pickup section, the control means returns the pickup section to a track where the error has originated. This arrangement allows the same data on that track to be read again.

As one preferred mode of embodiment, the present invention may be arranged in such a manner that the data recorded on the optical disk accompanies respective time codes and that the storage unit stores each data at an address thereof corresponding to the time code.

Now, the preferred embodiments of the present invention will be described in detail below with reference to the accompanying drawings.

DETAILED DESCRIPTION OF THE PREFERRED EMBODIMENTS

Now, with reference to FIG. 1, a description will be made on a CD (Compact Disc) player in accordance with an embodiment of the present invention.

Figure 1:
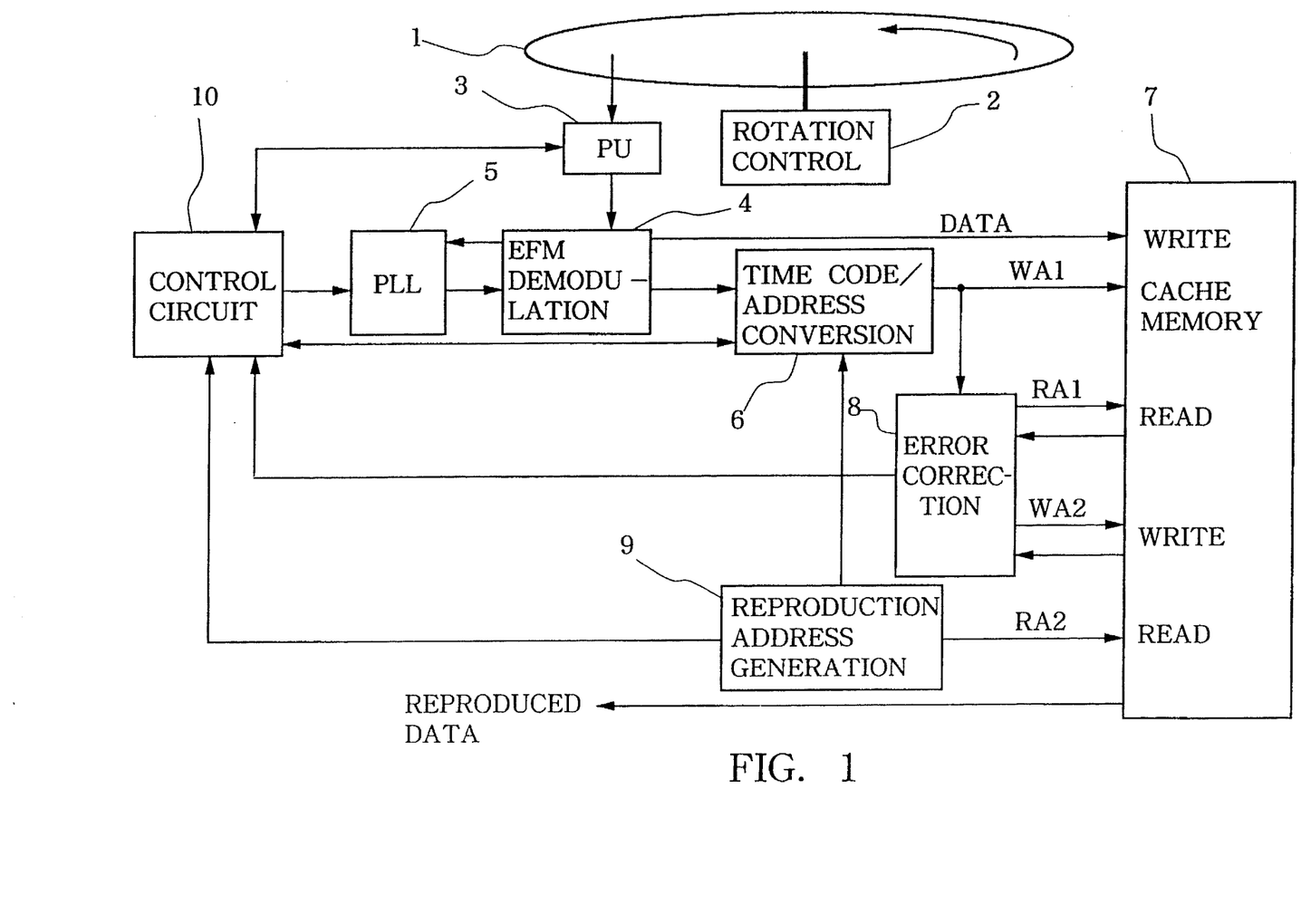
FIG. 1 is a block diagram of a first embodiment of the present invention.

In FIG. 1, the rotation of a Compact Disc 1 is controlled by means of a rotation control section 2. Here, it is assumed that the rotation speed of the Compact Disc 1 is about twice as fast as the speed necessary for data reproduction. A pickup section 3 reads EFM (Eight-to-Fourteen Modulation) signals recorded on the Compact Disc 1 and supplies the read signals to an EFM demodulation circuit 4. The pickup section 3 includes a focusing actuator for focusing a laser beam on the disc surface, a tracking actuator for keeping the laser beam set on every target track, and a servo system for applying necessary servo voltages to the focusing and tracking actuators.

The EFM demodulation circuit 4 demodulates each EFM signal supplied from the pickup section 3 and sends resultant demodulated EFM data to a time-code/address conversion circuit 6 and a cache memory 7. A PLL (Phase-Lock Loop) circuit 5 generates a clock signal synchronous with the EFM signal. On the basis of a time code contained in the demodulated data, the Lime code/address conversion circuit 6 calculates a data write address in the cache memory 7 and outputs the calculation result as a write address signal WA1. Consequently, the demodulated data will be written into an address in the cache memory 7 which is designated by the write address signal WA1.

As conventionally known, each time code of the Compact Disc 1 is composed of unit codes of "minute", "second" and "1/75 second", and each of the unit codes has a data length of eight bits. Accordingly, if the cache memory 7 has a data storage capacity equivalent to eight-second data, a write address signal WA1 corresponding to the time code can be obtained by forming 11-bit data using the lower three bits of the "second" unit code and the "1/75 second" unit code and then multiplying the thus-formed data by a predetermined value.

An error correction circuit 8 reads out the demodulated data from the cache memory 7 in response to a read address signal RA1 and performs an error correction operation on the read-out demodulated data. The resultant corrected data is then rewritten into the original address of the cache memory 7 in response to a write address signal WA2. A reproduction address generation circuit 9 provides the cache memory 7 with a read address signal RA2 that allows the demodulated data to be read out at a predetermined reproduction speed. Each read-out (reproduced) data from the cache memory 7 is converted into an analog signal by an analog-to-digital converter (not shown) and then output as an audio signal for audible reproduction. A control circuit 10 controls other components of the device on the basis of control programs which will be described later.

Next, a description will be made on the operation of the CD player in accordance with the embodiment of the present invention.

Figure 5:
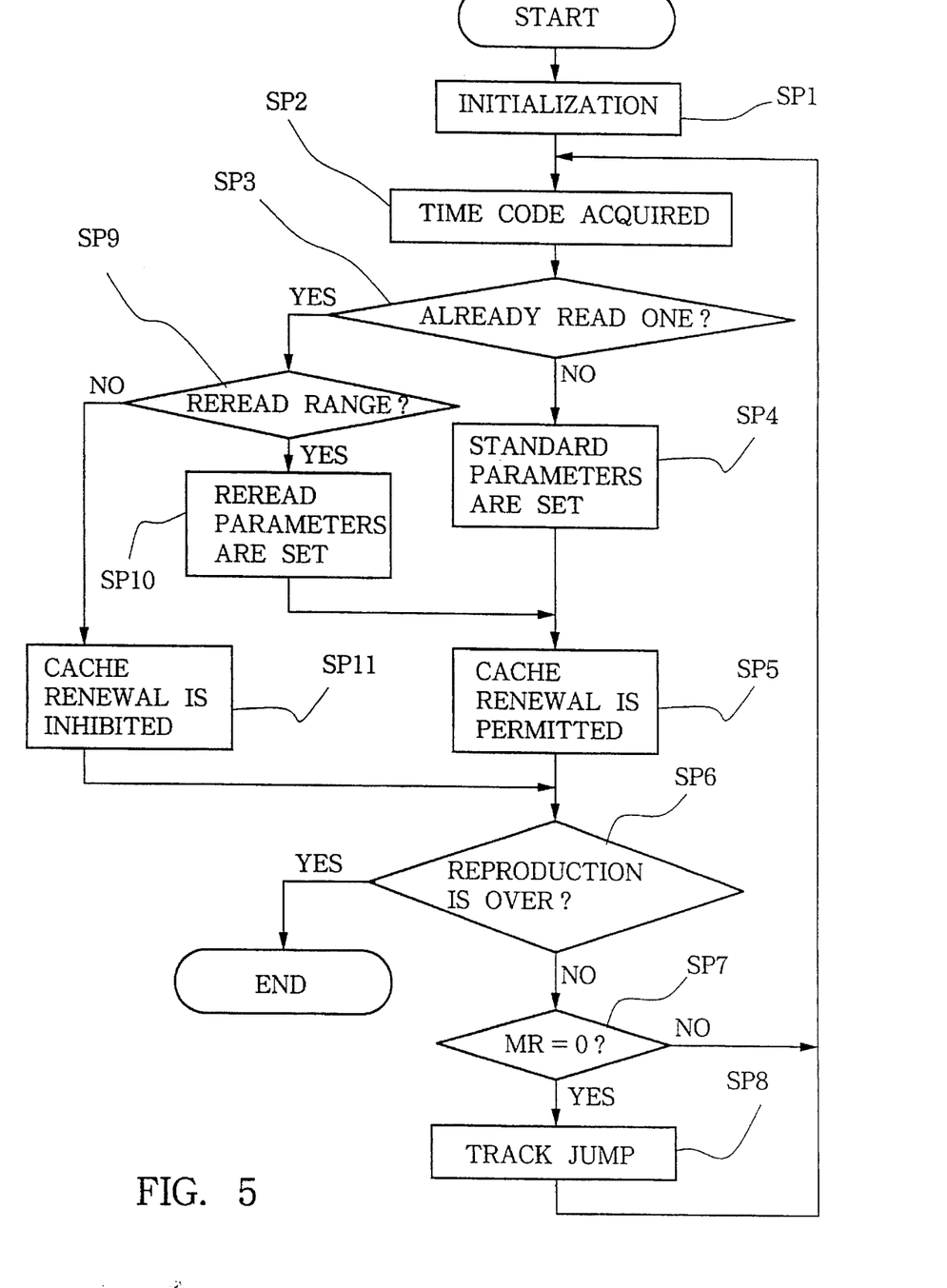
FIG. 5 is a flowchart of a main routine carried out in both of the first and second embodiments.

Once the CD player is placed in the reproduction mode, the pickup section 3 is moved to a reproduction start position, while the Compact Disc 1 is driven to rotate by the rotation control section 2. Thus, EFM signals read out from the Compact Disc 1 are sequentially demodulated by the EFM demodulation circuit 4. On the other hand, execution of a control program as shown in a flowchart of FIG. 5 is initiated in the control circuit 10.

Upon initiation of the control program, various necessary initializations are performed in step SP1. Then, the program proceeds to step SP2, where a time code is read out from the time code/address conversion circuit 6. In step SP3, a determination is made as to whether or not the read-out time code is an already read time code. Immediately after the CD player has been placed in the reproduction state, data read out from the Compact Disc 1 is new data and hence no same data as the read-out time code has been previously read out. Accordingly, the determination becomes negative (NO) in step SF3, and then the program proceeds to step SP4.

In step SP4, various standard parameters are set for use in controlling the pickup section 3. These standard parameters include gain parameters for the focusing and tracking servo mechanisms, etc., which are set to such values that are considered suitable for the normal readout condition. Then, the program proceeds to step SP5, where a renewal permission signal is supplied from the control circuit 10 to the time code/address conversion circuit 6. Upon receipt of the renewal permission signal, the time code/address conversion circuit 6 generates a write address signal WA1 on the basis of the time code, and demodulated data is written into an address of the cache memory 7 designated by the write address signal WA1. In step SP6, it is determined whether the reproduction from the Compact Disc 1 has finished or not. With an affirmative (YES) determination in step SP6, the control program comes to an end.

Figure 2:
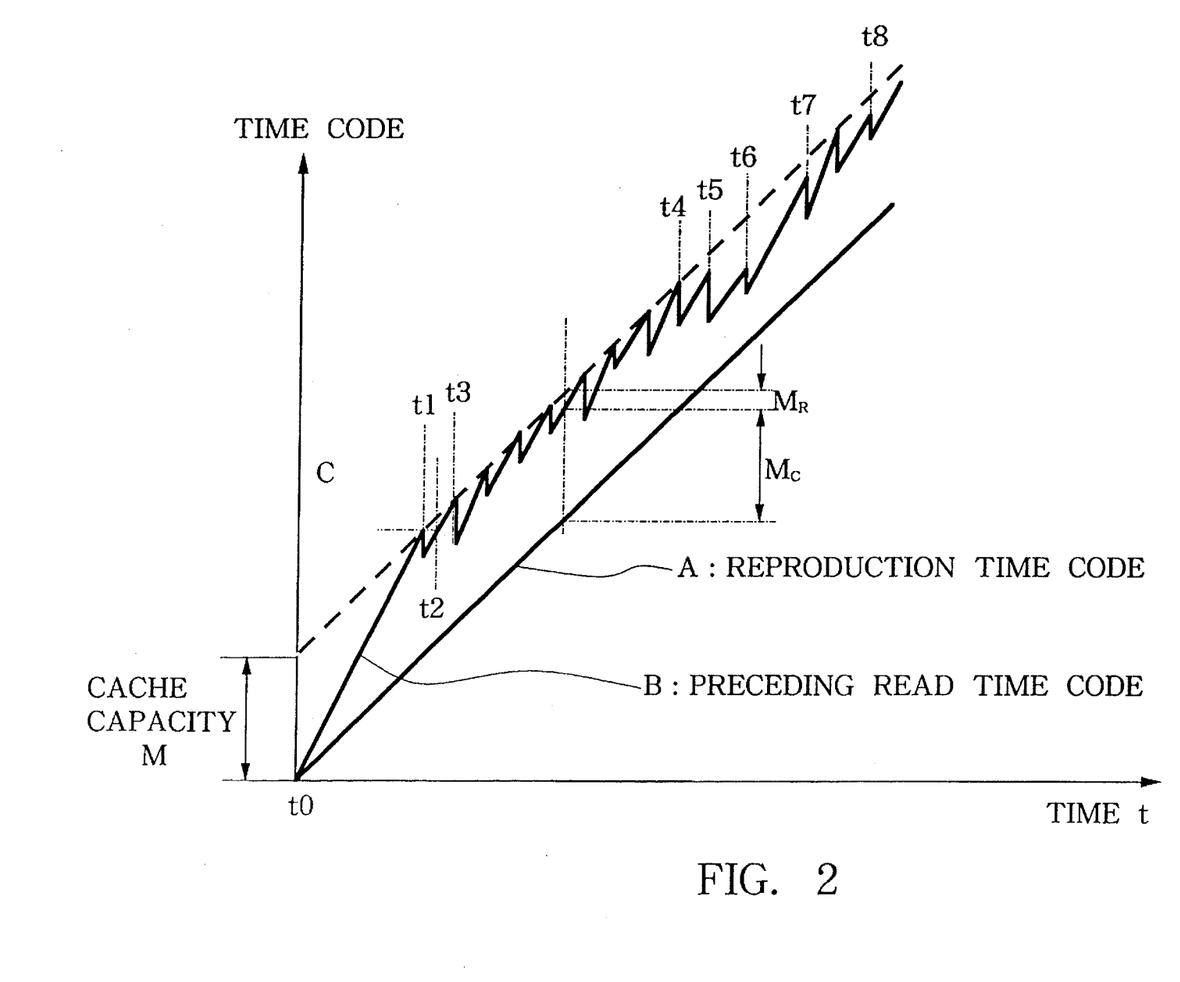
FIG. 2 is a diagram explanatory of the operation of the first embodiment.

With a negative determination in step SP6, the program reverts to step SP2 by way of step SP7 (which will be detailed later) to repetitively execute operations of steps SP2 to SP7. In this way, demodulated data output from the EFM demodulation circuit 4 are sequentially written into the cache memory 7. The thus-written data are applied to an error correction operation performed by the error correction circuit 8 and then are sequentially read out in response to respective read address signals RA2. A solid straight line A in FIG. 2 represents the time codes (reproduction time codes) of the data sequentially read out in response to the read address signal RA2 as noted above. Because the reproduction address generation circuit 9 generates the read address signals RA2 in such a manner to cause sound signals to be reproduced at a predetermined reproduction speed, the reproduction time codes A vary linearly as illustrated.

On the other hand, because the Compact Disc 1 rotates twice as fast as the speed necessary for the data reproduction, the time codes (preceding read time codes) of the demodulated data output from the EFM demodulation circuit 4 vary in acute inclination as represented by another solid line B. A broken line C in FIG. 2 represents the result obtained by adding the reproduction time codes A and the time code width corresponding to the capacity of the cache memory 7 (cache capacity M). Hereinafter, a portion of the cache capacity M where data has already been written but has not yet been read out by the reproduction address generation circuit 9 will be referred to as a "cache use amount MC", and the other portion than the cache use amount will be referred to as a "cache room MR". As clearly seen from the figure, for a period from time point t0 to time point t1, the cache room MR becomes smaller with the lapse of time.

Now, referring back to step SP 7 of FIG. 5, a determination is made as to whether the cache room MR has become zero. At time point t1, the cache room MR is zero, and hence an affirmative determination is obtained in step SP7, so that the program then goes to step SPS. In step SP8, the pickup section 3 is returned radially inwardly of the Compact Disc 1 across a predetermined number of tracks. Namely, a "track jump" takes place in step SP8. As a result, the preceding read time code B has a reduced value at time point t1 in the illustrated example of FIG. 2.

Once the program reenters step SP2, the time code of data to which the pickup section 3 has track-jumped is acquired. In the illustrated example of FIG. 2, the time code acquired for the period from time point t1 to time point t2 is the same as the one already acquired before time point t1. Therefore, for that time period, an affirmative determination is obtained in step SF3 and thus the program branches to step SP9. In step SP9, a determination is made as to whether the previously acquired time code in step SP2 fails within a predetermined reread range. The term reread range as used herein defines a range for which a data read operation should be performed again on the demodulated data already written in the cache memory 7, and the reread range is set for a range where many read errors have occurred.

If the reread range is not set at all, the program will go to step SP1 to inhibit the cache memory 7 from being renewed. Namely, the control circuit 10 supplies a renewal inhibition signal to the time code/address conversion circuit 6, so that the conversion circuit 6 is conditioned to not output any write address signal WA1. In this manner, within the period from time point t1 to time point t2, the contents of the cache memory 7 are not renewed although a time code i s acquired by step SP2.

Then, after time point t2 has passed by, data which has not yet been written in the cache memory is output from the EFM demodulation circuit 4, and accordingly a new time code is acquired in step SP2. Since the newly acquired time code is not an already read one, a determination of NO is obtained in step SP3, and thus the program proceeds via step SP4 to step SP5, where a renewal permission signal is supplied to the time code/address conversion circuit 6. Thus, for a period from time point t2 to time point t3, a write address signal WA1 is output on the basis of the new time code so that the contents of the cache memory 7 is renewed again. At time point t3, the cache room MR becomes zero again, and consequently another track jump takes place. Thereafter, similar operations to the above-mentioned are repeated.

It should be noted that the error correction circuit 8, which performs error correction on the demodulated data contained in the cache memory 7, may not be able to execute such correction when some significant scratch or flaw is present in the Compact Disc 1 to cause frequent errors within a short period. Once the error correction circuit 8 detects a correctable error, the circuit 8 supplies a time code for the error-detected place (error occurrence time code) to the control circuit 10, which in turn stores the supplied time code. Then, once the condition causing the frequent errors has been eliminated, a time code for the point where the error-causing condition has been eliminated (error end time code) is supplied from the error correction circuit 8 to the control circuit 10. The control circuit 10 stores the error end time code and initiates an interrupt routine program shown in FIG. 4.

Figure 4:
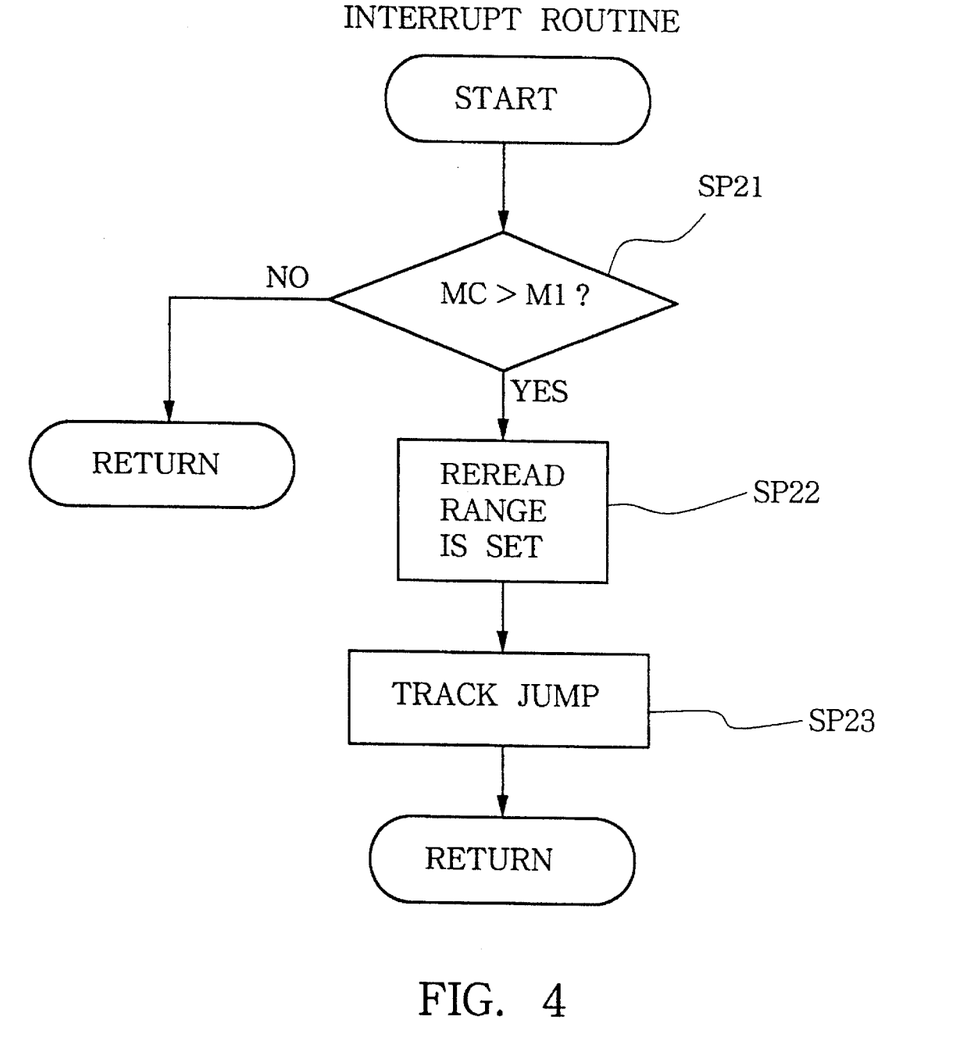
FIG. 4 is a flowchart of an interrupt routine carried out in both of the first and second embodiments.

Upon initiation of the interrupt routine program, a determination is made in step SP21 as to whether the cache use amount MC is greater than a predetermined value M1. This predetermined value M1 is set in consideration of a time required for the reread from the Compact Disc 1. In this embodiment, the cache memory 7 has such a storage capacity that can provide a sufficient cache use amount MC in a normal state (e.g., a period from time point t2 to time point t4). Therefore, when step SP21 is executed after a certain duration of the normal state, the determination in step SP21 becomes affirmative, and hence the program proceeds to step SP22.

In step SP22, a section from the error occurrence time code to the error end time code is set as a reread range. Next, upon entry of the program into step SP23, a track jump is made toward a track that is located slightly inner than a position corresponding to the error occurrence time code, and then the control circuit 10 returns to the main routine of FIG. 5. In the illustrated example of FIG. 2, it is assumed that uncorrectable error occurs a plurality of times, and step SP23 is executed at time points t5, t6, t7 and t8 in order to carry out a track jump although the cache room Mr is not zero.

Once the control circuit 10 has returned to the main routine after the interrupt process, step SP11 is repetitively executed via steps SP3 and SP9 until the time code reaches the reread range. Then, when the main routine proceeds to step SP9 via step SP3 after entry of the time code into the reread range, a determination of YES is obtained in step SP9, and the main routine proceeds to step SP10. In step SP10, reread parameters are set.

Like the standard parameters explained above in relation to step SP4, the reread parameters in this embodiment include gain parameters for the focusing and tracking servo mechanisms, etc. However, because the reread range is a range where data could not be read normally, there is little possibility of data being read normally even if the reread operation is performed using the standard parameters. It is therefore preferable to change various parameters for the data reread operation. For example, these parameters may be changed as follows:

(1) Reducing the gains of the tracking and focusing servo mechanisms

If the tracking servo gain is high, then it is very likely that the pickup section 3 reacts to scratch, flaw or the like present on the disk to excessively miss a target track. Therefore, it is preferable to reduce the tracking servo gain. For the same reason, the focusing servo gain may also be reduced.

(2) Offsetting the tracking servo in an opposite direction

Voltage value to be applied to the tracking actuator by the tracking servo is prestored in the control circuit 10 along with a time code. For the reread range, the invert of the prestored voltage value is supplied to the tracking servo as an offset value. This can offset a variation in the servo voltage that may be caused by scratch, flaw or the like on the disk 1.

(3) Placing the phased lock loop circuit 5 in the hold state

The phase of the output signal from the phase lock loop circuit 5 is varied in dependence on the phase of the EFM signal output from the pickup section 3. However, if the phase of the EFM signal is distorted by scratch, flaw or the like on the disk 1, it may take a certain amount of time for synchronuous data feed-in even when a normal EFM signal is supplied again. Accordingly, for the reread range, the phase lock loop circuit 5 may advantageously be placed in the hold state so as to avoid undesirable phase variation.

After various reread parameters have been set in step SP10, the routine proceeds to step SPS, where a cache renewal permission signal is supplied from the control circuit 10 to the time code/address conversion circuit 6. In response to this, EFM signals are read out from the Compact Disc 1 on the basis of the reread parameters, and demodulated signals of the EFM signals are sequentially written into the cache memory 7. Should any error occur at this time, another reread range is set in a similar manner to the above-mentioned, so that third, fourth, . . . reread operations are performed. In the illustrated example of FIG. 2, for instance, a reread operation is performed at time point t5 and an uncorrectable error occurs during the reread operation; so, another reread operation takes place at time point t6.

Once all data in the reread range have been normally reread, the routine proceeds to step SP2 so as to acquire a time code next to the reread range. If the acquired time code is an already read one, the routine goes to step SP11 by way of steps SP3 and SP9 so that the data reread operation is allowed to continue with renewal of the cache memory 7 inhibited. Then, once the acquired time code has passed beyond the already-read range, the routine executes step SP4 by way of step SP3 to return the various parameters to the standard parameter settings. Next, in step SPS, renewal of the cache memory 7 is permitted and performed on the basis of the standard parameters.

Since, as mentioned above, this embodiment performs a track jump when the cache room MR has reached a value of zero, it is not necessary to synchronize or match the rotations of the Compact Disc 1 controlled by the rotation control section 2 with the reproduction speed, and the operation of the device is not influenced even when some error is present in the rotations of the Compact Disc 1. This allows the rotational system of the device to be constructed simply and at low cost.

Further, according to this embodiment, since various parameters are changed and reread operation is performed when some uncorrectable error occurs, it is possible to achieve extremely stable performance of the device.

It is also to be noted here that whether the reread operation is being performed by the control circuit 10 or not, the read address signal RA2 output from the reproduction address generation circuit 9 is caused to increment at a constant rate. As a result, each time the reread operation is performed, the cache use amount MC decreases. Thus, once the interrupt process of FIG. 4 is carried out with the cache use amount MC below a predetermined value M1, a negative determination is obtained in step SP21, causing the process to return to the main routine of FIG. 5. Consequently, uncorrectable error is left unsolved.

However, in the above-described embodiment, since the reread operation is performed several times after having changed various parameters, it is very likely that the reread range, i.e., range within which uncorrectable error remains is narrowed gradually. In this manner, relatively high stability of performance of the device can be achieved even if the error is not completely eliminated.

Now, a second embodiment of the present invention will be described with reference to FIG. 3. Components corresponding to those in FIG. 1 are denoted by the same reference characters as in FIG. 1 and most of them will not be explained here to avoid unnecessary duplication.

Figure 3:
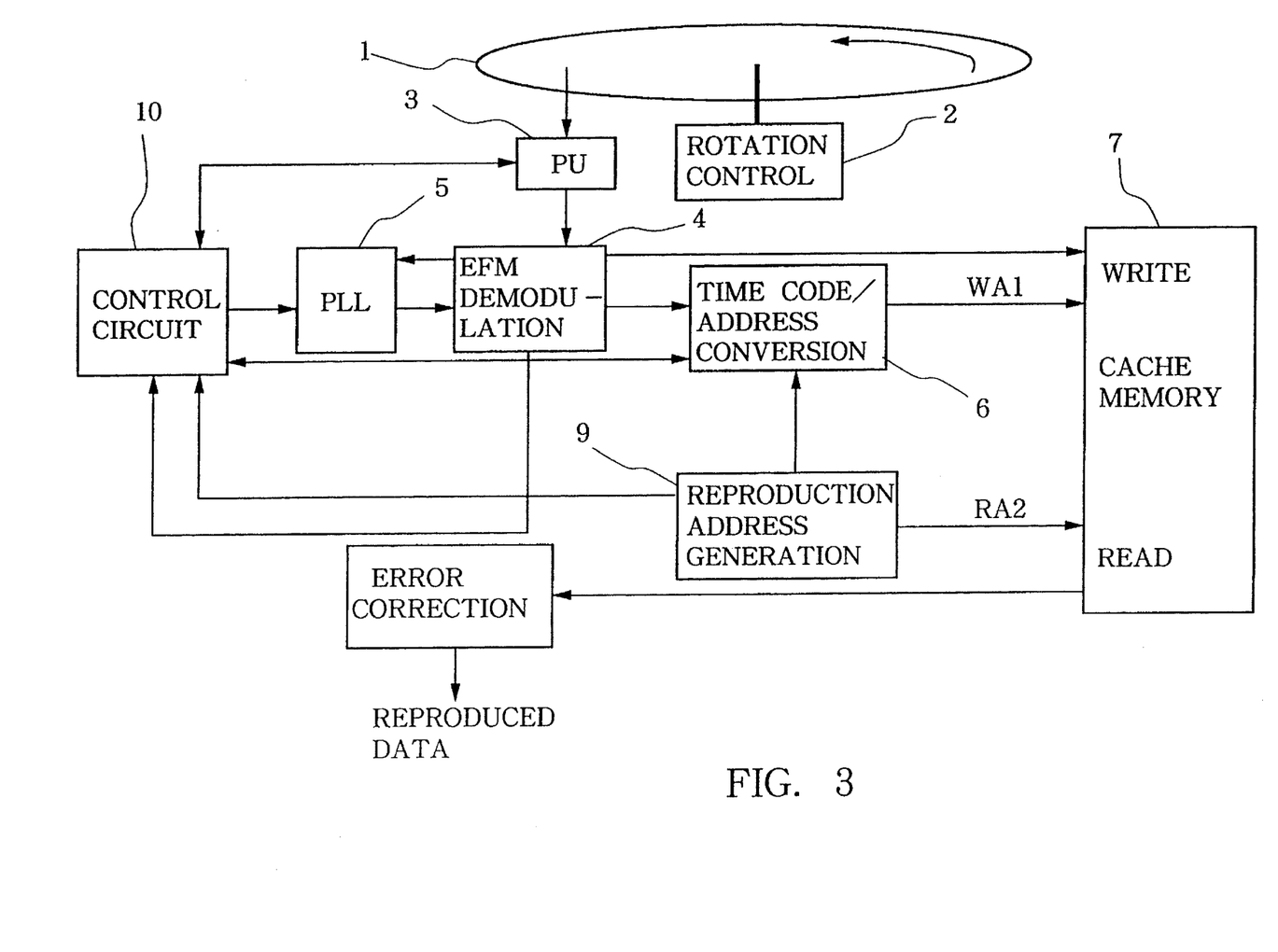
FIG. 3 is a block diagram of a second embodiment of the present invention.

In FIG. 3, an EFM demodulation circuit 14, similarly to the EFM demodulation circuit 4 of FIG. 1, demodulates each EFM signal to supply resultant demodulated data to a time code/address conversion circuit 6 and a cache memory 7. Further, the EFM demodulation circuit 14 is provided with a cyclical redundancy check (CRC) circuit to detect error in the demodulated data.

When the EFM demodulation circuit 14 detects some uncorrectable error in the demodulated data, a time code for the point containing the error (error occurrence time code) is supplied to and stored into a control circuit 10. Then, once a condition frequently causing errors is eliminated, a time code for the error-eliminated point (error end time code) is supplied from the EFM demodulation circuit 14 to the control circuit 10. The control circuit 10 triggers the interrupt process routine of FIG. 4 upon receipt of the error end time code, so that a reread range is set in step SP22 on the basis of the error occurrence time code and error end time code supplied from the EFM demodulation circuit 14.

Further, in the second embodiment, an error correction circuit 18 is provided at the last stage in place of the error correction circuit 8 of FIG. 1. The error correction circuit 18 performs error correction on reproduced data that is read out by a read address signal RA2, and then the circuit 18 output the result of the error correction. Other components than the above-mentioned are similar to those of the first embodiment.

Similarly to the first embodiment, this second embodiment performs a track jump when the cache room MR has reached a value of zero, and hence it is not necessary to synchronize or match the rotations of a Compact Disc 1 controlled by a rotation control section 2 with the reproduction speed, and the rotational system of the device can be constructed simply and at a low cost. In addition, since this embodiment performs reread operation on the basis of the time code output from the EFM demodulation circuit 14, it can achieve highly stable performance as in the first embodiment. Further, in this embodiment, the error correction circuit 18 performs error correction on the reproduced data read out by the read address signal RA2. Thus, the operation speed of the error correction circuit 18 only needs to be enough to follow the reproduced data and may operate at a slower speed than the error correction circuit 8 of the first embodiment. Consequently, this embodiment allows the CD player to be constructed at even a lower cost.

It should be appreciated that the above-described embodiments are only illustrative and various modifications as mentioned below are possible without departing from the scope of the present invention:

(1) In the above-described embodiments, reread parameters are set when step SP10 is executed for a given reread range (see FIG. 5), and same reread parameters are also used in third and succeeding reread operations. However, a preferred alternative arrangement may be such that the reread parameters are changed each time the reread operation is repeated so that data on the Compact Disc 1 are read out under various different conditions.

(2) In the above-described embodiments, in case the reread range can not be read out normally, the reread operation is repeated until the cash use amount MC becomes below a predetermined value M1 (see step SP21 of FIG. 4). However, the cache use amount MC decreases as such a repetition of the reread operation continues, and thus the reread operation may become impossible to perform when another uncorrectabe error occurs immediately after the repetition. Accordingly, for a same range, the reread operation may be performed only a limited number of times (e.g., three to five times), or the frequency of the reread operation may be determined depending on the cache use amount MC.

As has been described thus far, the present invention according to one aspect is characterized in that, whereas the pickup section is returned, as necessary, to a track from which data has already been read out, the readout means reads out data from the storage unit at a predetermined reproduction speed. This arrangement eliminates the need for accurately controlling the rotations of the optical disk and hence allows an optical disk device to be constructed at a low cost. The present invention according to another aspect is characterized in that if any uncorrectabe error is present in data read out from the pickup section, the control means returns the pickup section to a track where the error has originated. This arrangement allows same data to be read again and achieves high stability of performance of the optical disk device.

What is claimed is:

1. An optical disc reproducing device comprising:

data pickup means for reading out data and time codes recorded on an optical disk along tracks formed thereon;

rotation control means for rotating said optical disc that said data pickup means is allowed to read out the data faster than a predetermined reproduction speed;

storage means for storing the data read out by said data pickup means at addresses corresponding to the time codes;

readout means for sequentially reading out the data stored in said storage means at said predetermined reproduction speed; and control means for, when an amount of data in said storage means which has not yet been read out by said readout means reaches a predetermined value, returning said data pickup means to any of said tracks from which the data has already-been read out by said data pickup means.

2. An optical disk device comprising:

data pickup means for reading out data recorded on an optical disk along tracks formed thereon in accordance with read parameters;

rotation control means for rotating said optical disc such that said data pickup means is allowed to read out the data faster than a predetermined reproduction speed;

storage means for storing the data read out by said data pickup means;

readout means for sequentially reading out the data stored in said storage means at the predetermined reproduction speed; and control means for, when an amount of data in said storage means which has not yet been read out by said readout means reaches a predetermined value, returning said data pickup means to any one of said tracks from which the data has already been read out by said data pickup means in which an error has been detected and re-reading out the data by said pickup means by changing the read parameters and storing the re-read data in place of previously stored data.

3. A device according to claim 2, wherein the data pickup means also reads out time codes, and wherein the storage means stores the read out data at addresses corresponding to the time codes.

4. A device according to claim 2, wherein the read parameters include a tracking gain and a focusing gain, and wherein the tracking gain and the focusing gain are adjusted during the re-reading operation by the pickup means.

5. A device according to claim 2, wherein the read parameters include a tracking servo voltage that is prestored, and wherein an offset corresponding to the tracking servo voltage is applied during the re-reading operation by the pickup means.

6. A device according to claim 2, wherein the device further includes a phase lock loop that is used during the reading out operation by the pickup means, and wherein the phase lock loop is placed in a hold state during the re-read operation by the pickup means.

7. A device according to claim 2, wherein the read parameters are changed each time a re-read operation is performed by the pickup means.

8. A device according to claim 2, wherein the re-read operation by the pick-up means is only performed a limited number of times.

9. An optical disc reproducing device comprising:

a data pickup part that reads out data and time codes recorded on an optical disk along tracks formed thereon;

a rotation control part that rotates the optical disc such that the data pickup part is allowed to read out the data faster than a predetermined reproduction speed;

a storage device that stores the data read out by the data pickup part at addresses corresponding to the time codes;

a readout part that sequentially reads out the data stored in the storage device at the predetermined reproduction speed; and a control part that, when an amount of data in the storage means which has not yet been read out by the readout part reaches a predetermined value, returns the data pickup part to any of the tracks from which the data has already been read out by the data pickup part.

10. An optical disk device comprising:

a data pickup part that reads out data recorded on an optical disk along tracks formed thereon in accordance with read parameters;

a rotation control part that rotates the optical disc such that the data pickup part is allowed to read out the data faster than a predetermined reproduction speed;

a storage device that stores the data read out by the data pickup part;

a readout part that sequentially reads out the data stored in the storage device at the predetermined reproduction speed; and a control part that, when an amount of data in the storage device which has not yet been read out by the readout part reaches a predetermined value, returning the data pickup part to any one of the tracks from which the data has already been read out by the data pickup part in which an error has been detected and re-reading out the data by the pickup part by changing the read parameters and storing the re-read data in place of previously stored data.

11. A device according to claim 10, wherein the data pickup part also reads out time codes, and wherein the storage device stores the read out data at addresses corresponding to the time codes.

12. A device according to claim 10, wherein the read parameters include a tracking gain and a focusing gain, and wherein the tracking gain and the focusing gain are adjusted during the re-reading operation by the pickup part.

13. A device according to claim 10, wherein the read parameters include a tracking servo voltage that is prestored, and wherein an offset corresponding to the tracking servo voltage is applied during the re-reading operation by the pickup part.

14. A device according to claim 10, wherein the device further includes a phase lock loop that is used during the reading out operation by the pickup part, and wherein the phase lock loop is placed in a hold state during the re-read operation by the pickup part.

15. A device according to claim 10, wherein the read parameters are changed each time a re-read operation is performed by the pickup part.

16. A device according to claim 10, wherein the re-read operation by the pick-up part is only performed a limited number of times.

17. A method of reproducing data, the method comprising the steps of:

reading out data and time codes recorded on an optical disk along tracks formed thereon using a pickup part;

rotating the optical disc such that the reading out of the data occurs faster than a predetermined reproduction speed;

storing the data read out by said data pickup part at addresses corresponding to the time codes;

sequentially reading out the stored data at said predetermined reproduction speed; and returning the data pickup part to any of the tracks from which the data has already been read out by the data pickup part when an amount of stored data which has not yet been sequentially read out reaches a predetermined value.

18. A method of reproducing data, the method comprising the steps of:

reading out data recorded on an optical disk along tracks formed thereon in accordance with read parameters using a pickup part;

rotating the optical disc such that reading out of the data occurs faster than a predetermined reproduction speed;

storing the data read out by said data pickup part;

sequentially reading out the stored data the predetermined reproduction speed; and returning the data pickup part to any one of the tracks from which the data has already been read out by the data pickup part in which an error has been detected and re-reading out the data by the pickup part by changing the read parameters and storing the re-read data in place of previously stored data when an amount of stored data which has not yet been sequentially read out by reaches a predetermined value.

19. A method according to claim 18, further comprising the steps of reading out time codes with the pickup part, and storing the read out data at addresses corresponding to the time codes.

* * * * *